United States Patent
Geum

(10) Patent No.: US 8,496,988 B2
(45) Date of Patent: Jul. 30, 2013

(54) DISPENSER FOR FABRICATING LIQUID CRYSTAL DISPLAY PANEL AND METHOD FOR CONTROLLING GAP BETWEEN NOZZLE AND SUBSTRATE BY USING THE SAME

(75) Inventor: Chang-Seok Geum, Kyongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 10/660,655

(22) Filed: Sep. 12, 2003

(65) Prior Publication Data
US 2004/0090590 A1 May 13, 2004

(30) Foreign Application Priority Data
Nov. 11, 2002 (KR) ........................ 10-2002-0069768

(51) Int. Cl.
*G02F 1/13* (2006.01)

(52) U.S. Cl.
USPC ............................................ 427/58; 349/187

(58) Field of Classification Search
USPC ........................................ 427/8, 58, 64, 256
See application file for complete search history.

(56) References Cited

U.S. PATENT DOCUMENTS

| | | |
|---|---|---|
| 3,978,580 A | 9/1976 | Leupp et al. |
| 4,094,058 A | 6/1978 | Yasutake et al. |
| 4,653,864 A | 3/1987 | Baron et al. |
| 4,691,995 A | 9/1987 | Yamazaki et al. |
| 4,775,225 A | 10/1988 | Tsuboyama et al. |
| 5,247,377 A | 9/1993 | Omeis et al. |
| 5,263,888 A | 11/1993 | Ishihara et al. |
| 5,379,139 A | 1/1995 | Sato et al. |
| 5,406,989 A | 4/1995 | Abe |
| 5,409,545 A * | 4/1995 | Levey et al. ............... 134/22.18 |
| 5,431,771 A * | 7/1995 | Vinouze et al. ................. 216/23 |
| 5,499,128 A | 3/1996 | Hasegawa et al. |
| 5,507,323 A | 4/1996 | Abe |
| 5,511,591 A | 4/1996 | Abe |
| 5,539,545 A | 7/1996 | Shimizu et al. |
| 5,548,429 A | 8/1996 | Tsujita |
| 5,642,214 A | 6/1997 | Ishii et al. |
| 5,680,189 A | 10/1997 | Shimizu et al. |
| 5,742,370 A | 4/1998 | Kim et al. |
| 5,757,451 A | 5/1998 | Miyazaki et al. |
| 5,852,484 A | 12/1998 | Inoue et al. |

(Continued)

FOREIGN PATENT DOCUMENTS

| | | |
|---|---|---|
| EP | 1 003 066 | 5/2000 |
| EP | 1 240 913 A2 | 9/2002 |

(Continued)

*Primary Examiner* — Michael Cleveland
*Assistant Examiner* — Tabassom Tadayyon Eslami
(74) *Attorney, Agent, or Firm* — McKenna, Long & Aldridge, LLP

(57) ABSTRACT

A dispenser for fabricating a liquid crystal display panel and a method for controlling a gap between a nozzle and a substrate by using the same are disclosed in the present invention. The dispenser for fabricating a liquid crystal display panel includes a syringe having a nozzle at one end and separated from a substrate, a vertical driving motor driving the syringe in a vertical direction, a contact type switch switching on/off the vertical driving motor depending on whether the nozzle and the substrate are in contact with each other, and a first sensor detecting an initial value between the nozzle and the substrate by switching on and off the contact type switch.

5 Claims, 8 Drawing Sheets

U.S. PATENT DOCUMENTS

| | | |
|---|---|---|
| 5,854,664 A | 12/1998 | Inoue et al. |
| 5,861,932 A | 1/1999 | Inata et al. |
| 5,875,922 A | 3/1999 | Chastine et al. |
| 5,952,676 A | 9/1999 | Sato et al. |
| 5,956,112 A | 9/1999 | Fujimori et al. |
| 6,001,203 A * | 12/1999 | Yamada et al. ............... 156/106 |
| 6,011,609 A | 1/2000 | Kato et al. |
| 6,016,178 A | 1/2000 | Kataoka et al. |
| 6,016,181 A | 1/2000 | Shimada |
| 6,055,035 A | 4/2000 | von Gutfeld et al. |
| 6,139,639 A * | 10/2000 | Kitamura et al. ............. 118/680 |
| 6,144,438 A * | 11/2000 | Izumi ........................... 349/155 |
| 6,163,357 A | 12/2000 | Nakamura |
| 6,219,126 B1 | 4/2001 | Von Gutfeld |
| 6,222,603 B1 | 4/2001 | Sakai et al. |
| 6,226,067 B1 | 5/2001 | Nishiguchi et al. |
| 6,236,445 B1 | 5/2001 | Foschaar et al. |
| 6,284,073 B1 * | 9/2001 | Nemoto et al. ................. 156/64 |
| 6,304,306 B1 | 10/2001 | Shiomi et al. |
| 6,304,311 B1 | 10/2001 | Egami et al. |
| 6,337,730 B1 | 1/2002 | Ozaki et al. |
| 6,391,378 B1 * | 5/2002 | Carr et al. ........................ 427/8 |
| 6,414,733 B1 | 7/2002 | Ishikawa et al. |
| 6,455,099 B1 * | 9/2002 | Enchi et al. .................. 427/96.2 |
| 6,595,819 B1 * | 7/2003 | Kitahara et al. ................ 445/24 |
| 2001/0021000 A1 | 9/2001 | Egami |

FOREIGN PATENT DOCUMENTS

| | | |
|---|---|---|
| JP | 51-65656 | 6/1976 |
| JP | 57-38414 | 3/1982 |
| JP | 57-88428 | 6/1982 |
| JP | 58-27126 | 2/1983 |
| JP | 59-57221 | 4/1984 |
| JP | 59-195222 | 11/1984 |
| JP | 60-111221 | 6/1985 |
| JP | 60-164723 | 8/1985 |
| JP | 60-217343 | 10/1985 |
| JP | 61-7822 | 1/1986 |
| JP | 61-55625 | 3/1986 |
| JP | 62-89025 | 4/1987 |
| JP | 62-90622 | 4/1987 |
| JP | 62-205319 | 9/1987 |
| JP | 63-109413 | 5/1988 |
| JP | 63-110425 | 5/1988 |
| JP | 63-128315 | 5/1988 |
| JP | 63-311233 | 12/1988 |
| JP | 05-127179 | 5/1993 |
| JP | 5-154923 | 6/1993 |
| JP | 5-265011 | 10/1993 |
| JP | 5-281557 | 10/1993 |
| JP | 5-281562 | 10/1993 |
| JP | 05-323332 | 12/1993 |
| JP | 6-51256 | 2/1994 |
| JP | 06-114315 * | 4/1994 |
| JP | 6-148657 | 5/1994 |
| JP | 6-160871 | 6/1994 |
| JP | 6-235925 | 8/1994 |
| JP | 6-265915 | 9/1994 |
| JP | 6-313870 | 11/1994 |
| JP | 7-84268 | 3/1995 |
| JP | 7-128674 | 5/1995 |
| JP | 7-181507 | 7/1995 |
| JP | 8-95066 | 4/1996 |
| JP | 8-101395 | 4/1996 |
| JP | 8-106101 | 4/1996 |
| JP | 8-171094 | 7/1996 |
| JP | 8-190099 | 7/1996 |
| JP | 8-240807 | 9/1996 |
| JP | 09-005762 | 1/1997 |
| JP | 9-26578 | 1/1997 |
| JP | 9-61829 | 3/1997 |
| JP | 9-73075 | 3/1997 |
| JP | 9-73096 | 3/1997 |
| JP | 9-127528 | 5/1997 |
| JP | 9-230357 | 9/1997 |
| JP | 9-281511 | 10/1997 |
| JP | 9-311340 | 12/1997 |
| JP | 10-123537 | 5/1998 |
| JP | 10-123538 | 5/1998 |
| JP | 10-142616 | 5/1998 |
| JP | 10-177178 | 6/1998 |
| JP | 10-221700 | 8/1998 |
| JP | 10-282512 | 10/1998 |
| JP | 10-333157 | 12/1998 |
| JP | 10-333159 | 12/1998 |
| JP | 11-14953 | 1/1999 |
| JP | 11-38424 | 2/1999 |
| JP | 11-64811 | 3/1999 |
| JP | 11-109388 | 4/1999 |
| JP | 11-133438 | 5/1999 |
| JP | 11-142864 | 5/1999 |
| JP | 11-174477 | 7/1999 |
| JP | 11-212045 | 8/1999 |
| JP | 11-248930 | 9/1999 |
| JP | 11-326922 | 11/1999 |
| JP | 11-344714 | 12/1999 |
| JP | 2000-2879 | 1/2000 |
| JP | 2000-29035 | 1/2000 |
| JP | 2000-56311 | 2/2000 |
| JP | 2000-66165 | 3/2000 |
| JP | 2000-137235 | 5/2000 |
| JP | 2000-147528 | 5/2000 |
| JP | 2000-193988 | 7/2000 |
| JP | 2000-241824 | 9/2000 |
| JP | 2000-284295 | 10/2000 |
| JP | 2000-292799 | 10/2000 |
| JP | 2000-310759 | 11/2000 |
| JP | 2000-310784 | 11/2000 |
| JP | 2000-338501 | 12/2000 |
| JP | 2001-5401 | 1/2001 |
| JP | 2001-5405 | 1/2001 |
| JP | 2001-13506 | 1/2001 |
| JP | 2001-33793 | 2/2001 |
| JP | 2001-42341 | 2/2001 |
| JP | 2001-51284 | 2/2001 |
| JP | 2001-66615 | 3/2001 |
| JP | 2001-91727 | 4/2001 |
| JP | 2001-117105 | 4/2001 |
| JP | 2001-117109 | 4/2001 |
| JP | 2001-133745 | 5/2001 |
| JP | 2001-133794 | 5/2001 |
| JP | 2001-133799 | 5/2001 |
| JP | 2001-142074 | 5/2001 |
| JP | 2001-147437 | 5/2001 |
| JP | 2001-154211 | 6/2001 |
| JP | 2001-166272 | 6/2001 |
| JP | 2001-166310 | 6/2001 |
| JP | 2001-183683 | 7/2001 |
| JP | 2001-201750 | 7/2001 |
| JP | 2001-209052 | 8/2001 |
| JP | 2001-209060 | 8/2001 |
| JP | 2001-215459 | 8/2001 |
| JP | 2001-222017 | 8/2001 |
| JP | 2001-235758 | 8/2001 |
| JP | 2001-255542 | 9/2001 |
| JP | 2001-264782 | 9/2001 |
| JP | 2001-272640 | 10/2001 |
| JP | 2001-281675 | 10/2001 |
| JP | 2001-281678 | 10/2001 |
| JP | 2001-282126 | 10/2001 |
| JP | 2001-305563 | 10/2001 |
| JP | 2001-330837 | 11/2001 |
| JP | 2001-330840 | 11/2001 |
| JP | 2001-356353 | 12/2001 |
| JP | 2001-356354 | 12/2001 |
| JP | 2002-14360 | 1/2002 |
| JP | 2002-23176 | 1/2002 |
| JP | 2002-49045 | 2/2002 |
| JP | 2002-82340 | 3/2002 |
| JP | 2002-90759 | 3/2002 |
| JP | 2002-90760 | 3/2002 |
| JP | 2002-107740 | 4/2002 |
| JP | 2002-122872 | 4/2002 |
| JP | 2002-122873 | 4/2002 |
| JP | 2002-139734 | 5/2002 |
| JP | 2002-202512 | 7/2002 |

| | | | | | | |
|---|---|---|---|---|---|---|
| JP | 2002-202514 | 7/2002 | | WO | WO00/11710 | * 3/2000 |
| JP | 2002-214626 | 7/2002 | | WO | WO/0011710 | * 3/2000 |
| KR | 2000-0002415 | 2/2000 | | | | |
| KR | 2000-0035302 | 6/2000 | | | | |

* cited by examiner

DISPENSER FOR FABRICATING LIQUID CRYSTAL DISPLAY PANEL AND METHOD FOR CONTROLLING GAP BETWEEN NOZZLE AND SUBSTRATE BY USING THE SAME

This application claims the benefit of the Korean Application No. P2002-069768 filed on Nov. 11, 2002, which is hereby incorporated by reference.

BACKGROUND OF THE INVENTION

1. Field of the Invention

The present invention relates to a liquid crystal display panel, and more particularly, to a dispenser for fabricating a liquid crystal display panel and a method for controlling a gap between a nozzle and a substrate by using the same.

2. Discussion of the Related Art

In general, a liquid crystal display panel is a display device where data signals including picture information are individually supplied to liquid crystal cells arranged in a matrix form, and the light transmittance of the liquid crystal cells is controlled to display a desired picture. Thus, the liquid crystal display device includes a liquid crystal display panel, and a driver integrated circuit (IC) for driving the liquid crystal cells. The liquid crystal cells are arranged in a unit pixel in a matrix form.

The liquid crystal display panel includes a color filter substrate and a thin film transistor array substrate facing into each other. The liquid crystal display panel further includes a liquid crystal layer between the color filter substrate and the thin film transistor array substrate.

Data lines and gate lines are formed on the thin film transistor array substrate of the liquid crystal display panel, and intersect one another at right angles, so that liquid crystal cells are defined at each intersection. The data lines transmit a data signal supplied from the data driver integrated circuit to the liquid crystal cells, and the gate lines transmit a scan signal supplied from the gate driver integrated circuit to the liquid crystal cells. At one portion of the data lines and the gate lines, a data pad and a gate pad are provided in which data signals and scan signals are applied from the data driver integrated circuit and the gate driver integrated circuit.

The gate driver integrated circuit sequentially supplies the scan signal to the gate lines so that the liquid crystal cells arranged in a matrix form can be sequentially selected line by line, and the data signal is supplied to the selected one line of the liquid crystal cells from the data driver integrated circuit.

A common electrode and a pixel electrode are formed at the inner side of the color filter substrate and the thin film transistor array substrate, and apply an electric field to the liquid crystal layer. The pixel electrode is formed at each liquid crystal cell on the thin film transistor array substrate, while the common electrode is integrally formed at the entire surface of the color filter substrate. Therefore, by controlling a voltage applied to the pixel electrode in a state where a voltage is applied to the common electrode, the light transmittance of the liquid crystal cells can be individually controlled.

In order to control the voltage applied to the pixel electrode by liquid crystal cells, a thin film transistor used as a switching device is formed at each liquid crystal cell.

Elements of the liquid crystal display device will now be described.

FIG. 1 is a plane view of a unit liquid crystal display panel having a thin film transistor array substrate and a color filter substrate according to the related art.

In FIG. 1, a liquid crystal display panel 100 includes an image display part 113 where liquid crystal cells are arranged in a matrix form, a gate pad part 114 connected to the gate lines of the image display part 113, and a data pad part 115 connected to the data lines of the image display part 113. The gate pad part 114 and the data pad part 115 are formed along the edge region of the thin film transistor array substrate 101 that does not overlap the color filter substrate 102. The gate pad part 114 supplies a scan signal from the gate driver integrated circuit to the gate lines of the image display part 113, and the data pad part 115 supplies image information from the data driver integrated circuit to the data lines of the image display part 113.

The data lines to which image information is applied and the gate lines to which a scan signal is applied intersect one another. A thin film transistor for switching the liquid crystal cells, a pixel electrode for driving the liquid crystal cells by connecting the thin film transistor, and a passivation layer formed at the entire surface to protect the electrodes and the thin film transistor are provided at the intersections.

Color filters formed at the cell regions separated by the black matrix and a common transparent electrode formed at the thin film transistor array substrate 101 are provided at the color filter substrate 102 of the image display part 113. A cell gap is formed by a spacer between the thin film transistor array substrate 101 and the color filter substrate 102, and the thin film transistor array substrate 101 and the color filter substrate 102 are attached to each other by a seal pattern 116 formed along the outer edge of the image display part 113, thereby forming a unit liquid crystal display panel.

In fabricating a unit liquid crystal display panel, a plurality of unit liquid crystal display panels are simultaneously formed on a large-scale mother substrate. Thus, it requires a process for separating the unit liquid crystal display panels from the large-scale mother substrate by cutting and processing the mother substrate with the plurality of liquid crystal display panels formed thereon.

As for the unit liquid crystal display panel separated from the large-scale mother substrate, liquid crystal is injected through a liquid crystal injection hole to form a liquid crystal layer at the cell gap that separates the thin film transistor array substrate 101 and the color filter substrate 102, and then the liquid crystal injection hole is sealed.

As mentioned above, in order to fabricate a unit liquid crystal display panel, the following processes are generally required. The thin film transistor array substrate 101 and the color filter substrate 102 are separately fabricated and attached to each other, so that a uniform cell gap is maintained therebetween. And, the attached substrates are cut into unit liquid crystal display panels, then a liquid crystal is injected into the cell gap of the unit liquid crystal display device panel.

Especially, the process of forming the seal pattern 116 along the outer edge of the image display part 113 is required to attach the thin film transistor array substrate 101 and the color filter substrate 102. A method of a seal pattern according to the related art will now be described as follows.

FIGS. 2A and 2B illustrate a screen printing process to form a seal pattern according to the related art.

As shown in FIGS. 2A and 2B, a patterned screen mask 206 is provided so that a seal pattern forming region is selectively exposed. A rubber squeegee 208 is provided for selectively supplying a sealant 203 to a substrate 200 through the screen mask 206 to form a seal pattern 216.

The seal pattern 216 formed on the substrate 200 is to be used for a cell gap to which liquid crystal is injected, and prevents leakage of the injected liquid crystal. Thus, the seal pattern 216 is formed along the outer edge of the image display part 213 of the substrate 200, and a liquid crystal injection hole is formed at one side of the seal pattern 216.

The screen printing method includes applying the sealant 203 on the screen mask 206 with a seal pattern forming region patterned thereon, forming the seal pattern 216 on the substrate 200 through printing with the rubber squeegee 208, evaporating a solvent contained in the seal pattern 216, and leveling the seal pattern 216.

The screen printing method is widely used due to an advantage in convenience in the process. However, it is disadvantageous in that the sealant 203 is much consumed as the sealant 203 is applied at the entire surface of the screen mask 206 and printed with the rubber squeegee 208 to form the seal pattern 216.

In addition, the screen printing method has a problem that the rubbing process of an alignment layer (not shown) formed on the substrate 200 is defective as the screen mask 206 and the substrate 200 are in contact with each other, thereby degrading a picture quality of the liquid crystal display device.

Therefore, in order to complement the shortcomings of the screen printing method, a seal dispensing method has been proposed.

FIG. 3 is a schematic view illustrating a dispensing method for forming a seal pattern according to the related art.

As shown in FIG. 3, a table 310 with a substrate 300 loaded thereon is moved in forward/backward and left/right directions. At the same time, a seal pattern 316 is formed along the outer edge of an image display part 313 of the substrate 300 by applying a pressure to a syringe 301 filled with a sealant.

In the seal dispensing method, as a sealant is selectively supplied to the region where the seal pattern 316 is to be formed, a sealant consumption can be reduced. In addition, since the syringe 301 is not in contact with an alignment layer (not shown) of the image display part 313 of the substrate 300, the rubbed alignment layer would not be damaged, and thus a picture quality of the liquid crystal display device can be improved.

In case of forming the seal pattern 316 on the substrate 300 loaded on the table 310 by using the syringe 301, a gap between the substrate 300 and the syringe 301 must be precisely controlled.

In other words, if the substrate 300 and the syringe 301 are too close to each other, the seal pattern 316 formed on the substrate 300 becomes widened and has a short height. If, however, the substrate 300 and the syringe 301 are separated to far apart from each other, the seal pattern 316 formed on the substrate 300 becomes narrow and a broken part may exist, thereby causing a defect in the liquid crystal display device.

In addition, if the sealant filled in the syringe 301 is completely used up, a broken part may exist in the seal pattern 316, or the seal pattern 316 is not formed at all. In this case, the syringe 301 should be replaced with another syringe 301 filled with a sealant before it is completely used up. At this time, however, the gap between the substrate 300 and the syringe 301 varies with how the syringe 301 is combined with the dispenser, and thus, the gap between the substrate 300 and the syringe 301 should be newly set whenever the syringe 301 is replaced with a new one.

The syringe 301 is frequently replaced in manufacturing products. Therefore, there is a demand for a method for setting the gap between the substrate 300 and the syringe 301 within a short time.

In the related art, in order to control the gap between the substrate 300 and the syringe 301, a manual operation method has been adopted, which will now be described in detail.

FIG. 4 is a schematic view showing a seal dispenser for fabricating a liquid crystal display panel according to the related art.

As shown in FIG. 4, a seal dispenser includes a syringe 403 having a nozzle 402 at one end thereof and supplying a sealant onto a substrate 401 loaded on a table 400, a vertical driving motor 405 for driving a body 404 in the vertical direction, a micrometer 406 for driving the vertical driving motor 405 by a manual operation, a first sensor 407 for detecting a contact between the substrate 401 and the nozzle 402, and a second sensor 408 for detecting a gap between the substrate 401 and the nozzle 402.

FIG. 5 is a flow chart illustrating the method for controlling a gap between the nozzle and the substrate by using the seal dispenser of FIG. 4.

As shown in FIG. 5, the method for controlling a gap between the nozzle and the substrate by using the seal dispenser of the liquid crystal display panel includes lowering the nozzle 402 by manually manipulating the micrometer 406, detecting whether the nozzle 402 and the substrate 401 are in contact with each other, lifting up the nozzle 402 by manually manipulating the micrometer 406, and stopping the nozzle and constantly maintaining a desirable gap between the nozzle 402 and the substrate 401.

The related art seal dispenser for fabricating the liquid crystal display panel and the method for controlling a gap between the nozzle and the substrate by using the dispenser will now be described.

First, when the substrate 401 is loaded on the table 400, a user drives the vertical driving motor 405 by manually manipulating the micrometer 406, thereby lowering the syringe 403 mounted in the body 404. At this time, the user detects whether the nozzle 402 provided at one end portion of the syringe 403 and the substrate 401 loaded on the table 400 are in contact with each other through a process of monitoring a value measured by the first sensor 407.

When the substrate 401 and the nozzle 402 are detected to be in contact with each other by the first sensor 407, the user drives the vertical driving motor 405 by manually manipulating the micrometer 406, thereby lifting up the syringe 403 mounted in the body 404. At this time, the user detects whether the gap between the substrate 401 and the nozzle 402 reaches a pre-set value through a process of monitoring a value measured by the second sensor 408 and stops manipulating the micrometer 406.

However, the related art seal dispenser for fabricating the liquid crystal display panel and the method for controlling a gap between the nozzle and the substrate have the following problems.

Since the user controls the gap between the substrate 401 and the nozzle 402 by manually manipulating the micrometer 406, reliability is much degraded, and yield in fabricating liquid crystals display panel is decreased.

In addition, much time is required for setting the gap between the substrate 401 and the nozzle 402 precisely even by a skilled user, resulting in degrading productivity.

Furthermore, since the gap is set by the user's manual operation, an equipment manipulation is inconvenient in the related art process.

SUMMARY OF THE INVENTION

Accordingly, the present invention is directed to a dispenser for fabricating a liquid crystal display panel and a method for controlling a gap between a nozzle and a substrate by using the same that substantially obviate one or more of problems due to limitations and disadvantages of the related art.

Another object of the present invention is to provide a dispenser for fabricating a liquid crystal display panel and a method for controlling a gap between a nozzle and a substrate by using the same that are capable of automatically controlling the gap between the nozzle provided at the dispenser and the substrate.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a dispenser for fabricating a liquid crystal display panel includes a syringe having a nozzle at one end separated from a substrate, a vertical driving motor driving the syringe in a vertical direction, a contact type switch switching on/off the vertical driving motor depending on whether the nozzle and the substrate are in contact with each other, and a first sensor detecting an initial value between the nozzle and the substrate by switching on and off the contact type switch.

In another aspect of the present invention, a method for controlling a gap between a nozzle and a substrate by using a dispenser for fabricating a liquid crystal display panel includes lowering a body supporting a syringe having a nozzle at one end until the nozzle contacts a substrate, determining an initial value between the nozzle and the substrate by turning on or turning off a contact type switch by lifting up the body when the nozzle contacts the substrate, lifting up the body, so that the nozzle is isolated from the substrate, and lowering the body, so that the nozzle reaches a desirable height from the initial value.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF THE ILLUSTRATED EMBODIMENTS

Reference will now be made in detail to the illustrated embodiments of the present invention, examples of which are illustrated in the accompanying drawings. Wherever possible, the same reference numbers will be used throughout the drawings to refer to the same or like parts.

Figure 1:
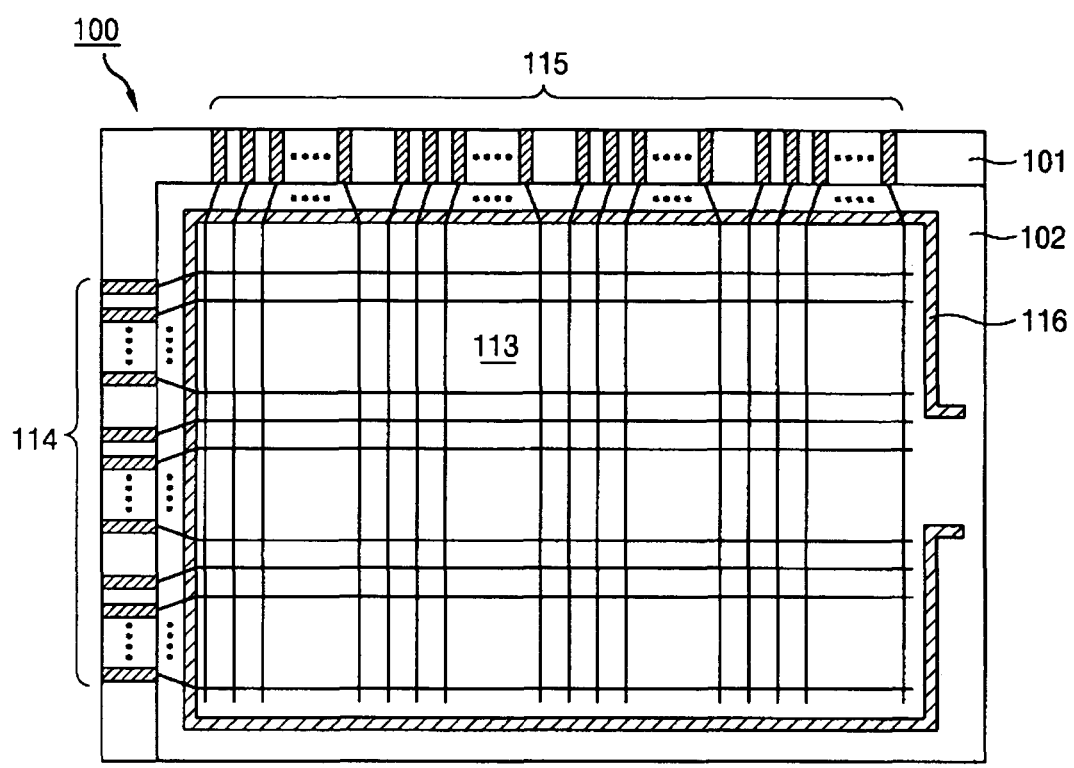
FIG. 1 is a plane view of a unit liquid crystal panel formed by a thin film transistor array substrate and a color filter substrate according to the related art.
Figure 2A:
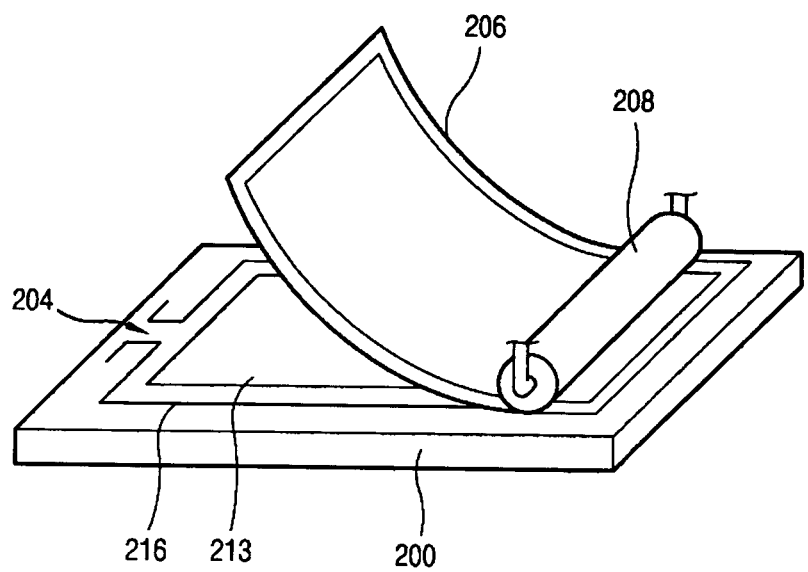
FIGS. 2A and 2B illustrate a screen printing method to form a seal pattern according to the related art.
Figure 2B:
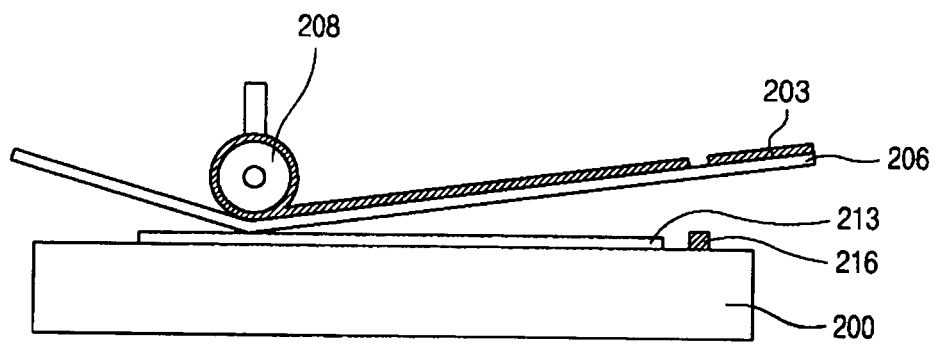
Figure 3:
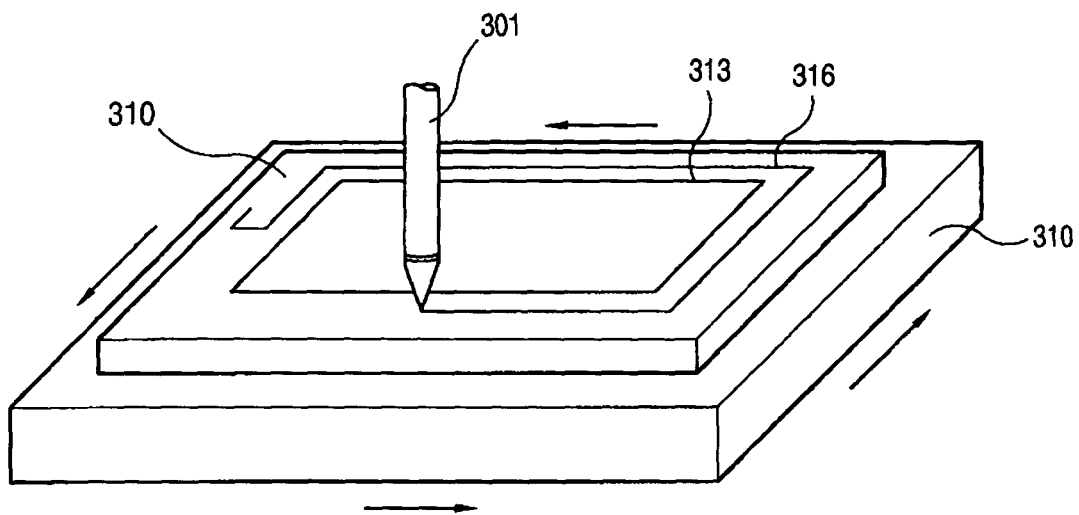
FIG. 3 is a schematic view illustrating a dispensing method for forming a seal pattern according to the related art.
Figure 4:
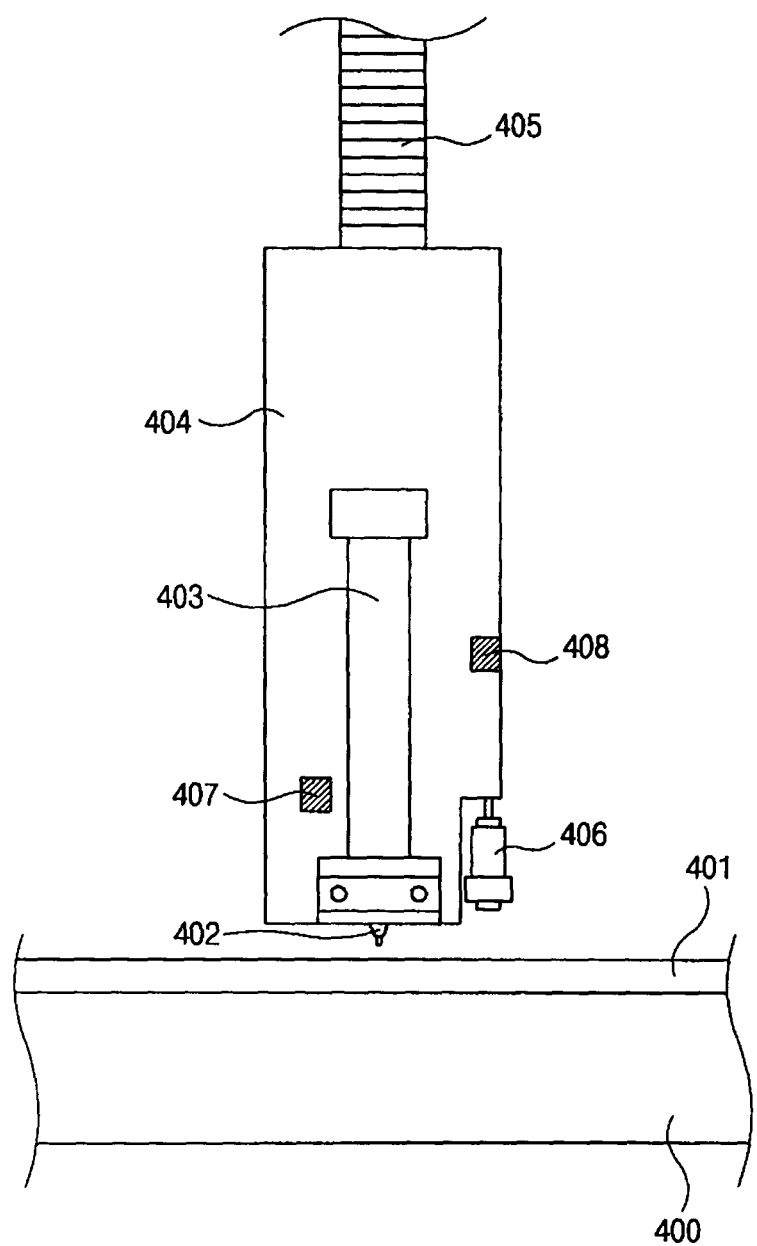
FIG. 4 a schematic view showing a seal dispenser for fabricating a liquid crystal display panel according to the related art.
Figure 5:
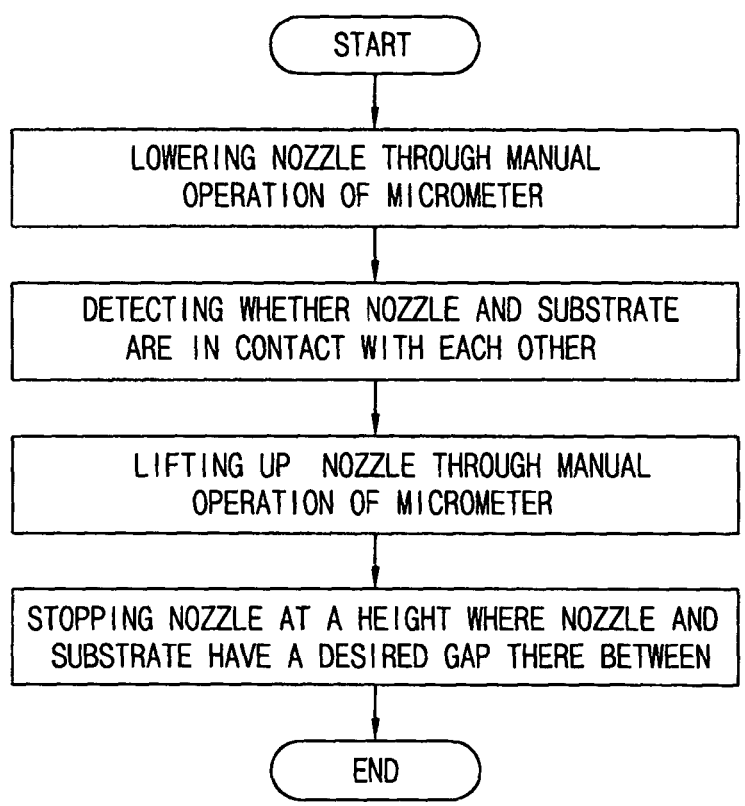
FIG. 5 is a flow chart illustrating the method for controlling a gap between a nozzle and a substrate by using the seal dispenser of FIG. 4.
Figure 6:
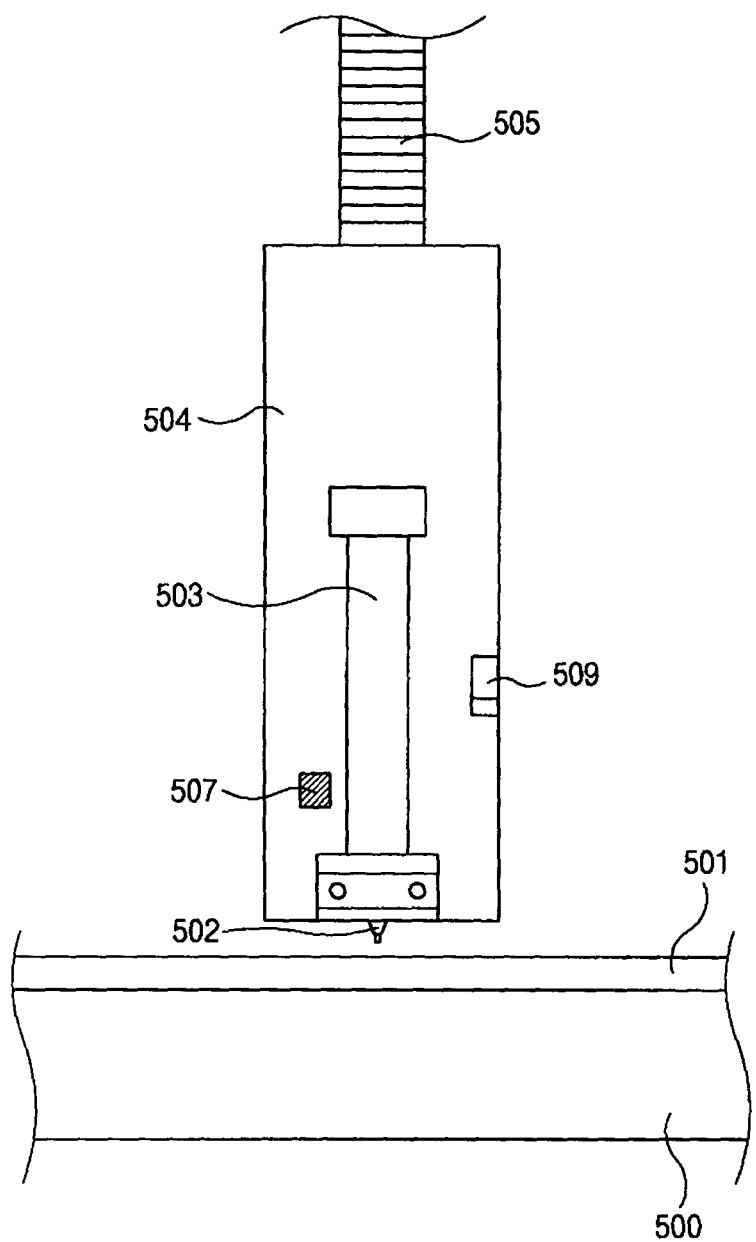
FIG. 6 illustrates a dispenser for fabricating a liquid crystal display panel according to the present invention.

FIG. 6 illustrates a dispenser for fabricating a liquid crystal display panel according to the present invention.

As shown in FIG. 6, a dispenser according to the present invention includes a syringe 503 with a nozzle 502 provided at one end portion thereof and supplying a sealant onto a substrate 501 loaded on a table 500, a body 504 in which the syringe 503 is installed, a contact type switch 509 for switching from opening to closing, and vice versa, depending on whether the nozzle 502 of the syringe 503 and the substrate 501 are in contact with each other, a first sensor 507 for detecting an initial value with which the nozzle 502 of the syringe 503 and the substrate 501 are in contact with each other according to the contact type switch 509, and a vertical driving motor 505 for driving the body 504 in the vertical direction.

Figure 7:
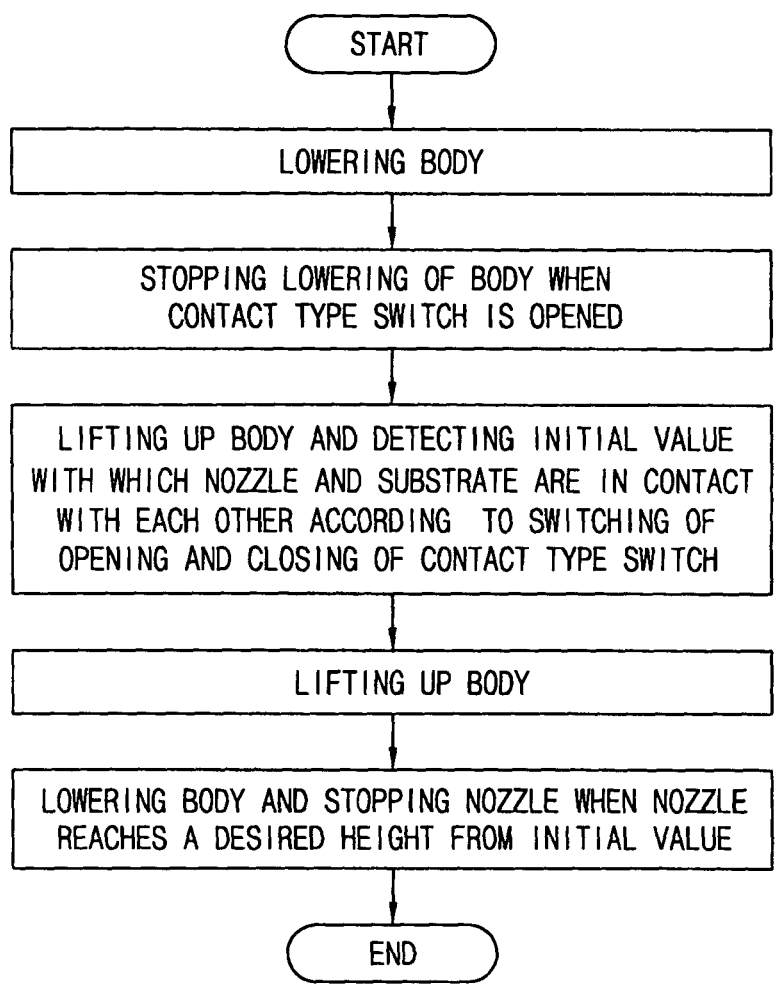
FIG. 7 is a flow chart illustrating a method for controlling a gap between a nozzle and a substrate by using the dispenser of FIG. 6.

FIG. 7 is a flow chart illustrating a method for controlling a gap between a nozzle and a substrate by using the dispenser of FIG. 6.

As shown in FIG. 7, a method for controlling a gap between a nozzle and a substrate by using the dispenser includes lowering the body 504 with the syringe 503 installed therein, stopping the lowering the body 504 when the switch 509 is opened, and the nozzle 502 of the syringe 503 and the substrate 500 are in contact with each other due to the lowering the body 504, detecting an initial value with which the nozzle 502 and the substrate 501 are in contact with each other by opening or closing the contact type switch 509 by lifting up the body 504, lifting up the body 504 so that the nozzle 502 can be isolated from the substrate 501, and lowering the body 504 so that the nozzle 502 can reach a desired height from the initial value.

The dispenser for fabricating a liquid crystal display panel and the method for controlling a gap between the nozzle and the substrate by using the dispenser will now be described in detail.

First, when the substrate 501 is loaded on the table 500, the vertical driving motor 505 is driven to lower the position of the body 504 with the syringe 503 installed therein.

When the nozzle 502 provided at one end portion of the syringe 503 is in contact with the substrate 501 due to the lowered body 504, the contact type switch 509 is opened, and at this time, the vertical driving motor 505 stops lowering the body 504 and lifts up the body 504 at a speed slower than that of the lowering the body 504.

When the body 504 is lifted up by the vertical driving motor 505, the nozzle 502 is isolated from the substrate 501 and an opening or closing state of the contact type switch 509 is switched. At this time, an initial value is detected and stored by the first sensor 507. Thus, the initial value signifies the height information on the nozzle 502 when the nozzle 502 is in contact with the substrate 501.

For example, a laser displacement sensor may be adopted as the first sensor 507, which can measure ±200 μm (micrometer)

The vertical driving motor 505 lifts up the body 504 so as to be separated from the substrate 501 with a distance and then lowers the body 504. When the nozzle 502 reaches a desired height from the initial value, the vertical driving motor 505 stops lowering the body 504. Thus, when the nozzle 502 reaches a height of, for example, about 40 μm (micrometer) from the initial value, the lowering of the body 504 is stopped and a gap between the nozzle 502 and the substrate 501 is controlled to be maintained at about 40 μm (micrometer).

After the gap between the substrate 501 and the nozzle 502 is controlled to be maintained at a certain interval, either the table 500 on which the substrate 501 has been loaded or the body 504 with the syringe 503 installed therein is horizontally moved, so that a relative position is changed, while the sealant is discharged to form a seal pattern on the substrate 501.

In case that the body 504 with the syringe 503 installed therein is moved, an undesirable material may be generated by the horizontal driving of the dispenser and adsorbed onto the substrate 501. Thus, the table 500 with the loaded substrate 501 may be horizontally moved in forward/backward and left/right directions in forming a seal pattern.

As mentioned above, in the dispenser for fabricating a liquid crystal display panel and the method for controlling a gap between the nozzle and the substrate by using the dispenser in the present invention, driving conditions are inputted by a user through an input unit such as a touch panel or a keyboard. The vertical driving motor 505 automatically lowers, stops, lifts up, and lowers again the body 504. Thus, the process to control the gap between the nozzle 502 provided at the syringe 503 and the substrate 501 loaded on the table 500 can be simple and precise.

Thus, the reliability is improved compared to the manual operation of the related art and a product failure can be reduced.

In addition, even for an unskilled user, he/she can precisely control the gap between the substrate 501 and the nozzle 502 within a short time, so that a productivity can be considerably improved.

In the present invention as described above, the seal pattern is formed on the substrate 501 through the syringe 503 filled with the sealant. Further, in fabricating the liquid crystal display panel, the preferred embodiment of the present invention can be also adopted for forming a liquid crystal layer.

The method for forming a liquid crystal layer can be divided into a vacuum injection method and a dropping method, which will now be described in detail.

The vacuum injection method is that a liquid crystal injection hole of a unit liquid crystal display panel separated from a large-scale mother substrate is dipped in a container filled with liquid crystal in a chamber under a vacuum condition, and then the liquid crystal is injected into the liquid crystal display panel, which is caused by a pressure difference between the inner side and the outer side of the liquid crystal display panel by varying a vacuum condition. After the liquid crystal is filled in the liquid crystal display panel, the liquid crystal injection hole is sealed, thereby forming the liquid crystal layer of the liquid crystal display panel.

However, the vacuum injection method as described above has the following problems.

Most of all, it takes too much time for filling the liquid crystal in the liquid crystal display panel. In general, the attached liquid crystal display panel with an area of several hundreds cm² (square centimeter) has only a gap of a few μm (micrometer). Thus, even with the vacuum injection method utilizing a pressure difference, an injected amount of the liquid crystal by unit time is quite small.

For instance, in case of fabricating a liquid crystal display panel of about 15 inches, about 8 hours are required to fill the gap with the liquid crystal. Thus, the productivity is much reduced due to such a long period of time for fabricating a liquid crystal display panel.

In addition, as the liquid crystal display panel becomes large in size, it takes more time required to fill the liquid crystal and a deficiency in filling the liquid crystal may occur. Therefore, the liquid crystal cannot be properly filled by using the vacuum injection method in the large-scale liquid crystal display panel.

Other problem is that too much of the liquid crystal is consumed in the vacuum injection method. In general, an actually injected amount of the liquid crystal is very small compared to the amount of the liquid crystal filled in the container, and when the liquid crystal is exposed to the air or a specific gas, it reacts with the gas and becomes degraded. Thus, even if the liquid crystal stored in the container is to fill a plurality of the liquid crystal display panels, a large amount of the liquid crystal still remains after the filling process and the leftover will be discarded. Thus, a unit price of the liquid crystal display will be increased and lose the competitive edge in price.

In order to overcome such problems in the vacuum injection method, recently, a dropping or dispensing method is applied.

A dropping method is that liquid crystal is dropped and dispensed on a plurality of thin film transistor array substrates fabricated on one large-scale mother substrate or on a plurality of color filter substrates fabricated on another large-scale mother substrate by using a dispenser in accordance with the present invention, and then the two mother substrates are attached to each other so that the liquid crystal is uniformly distributed at the entire image display regions by the attaching pressure, thereby forming a liquid crystal layer between the substrates.

Accordingly, through the dropping method, liquid crystal can be dropped in a short time compared to the vacuum injection method. Thus, even if the liquid crystal display panel is large in size, the liquid crystal layer can be formed quickly.

In addition, since only a required amount of liquid crystal is dropped on the substrate, the dropping method prevents waste of liquid crystal, so that the unit price can be maintained with a good competitive price.

Unlike the vacuum injection method, the dropping method necessarily proceeds with separating unit liquid crystal display panels from the large-scale mother substrate after the liquid crystal layer is formed. Thus, in case of dropping liquid crystal on the substrate through the dropping method, the dispenser of the liquid crystal display panel according to the present invention can be used.

As stated above, with the dispenser for the liquid crystal display panel according to the present invention, the sealant is filled in the syringe 503, the gap between the nozzle 502 provided at one end portion of the syringe 503 and the substrate 501 is precisely controlled in forming a seal pattern at the outer edge of the image display part of the substrate 501. In this respect, in case of applying the liquid crystal, the syringe 503 is filled with the liquid crystal, the gap between the nozzle 502 and the substrate 501 is precisely controlled, and the liquid crystal is dropped to a desired position of the substrate 501. In this manner, the present invention can be applied to form a liquid crystal layer by using the dropping method.

In addition, the dispenser for fabricating a liquid crystal display panel and the method of controlling a gap between a nozzle and a substrate can be also applied to a formation of a silver (Ag) dot in fabricating a liquid crystal display panel.

The formation of the silver (Ag) dot will now be described with reference to the accompanying drawings.

Figure 8:
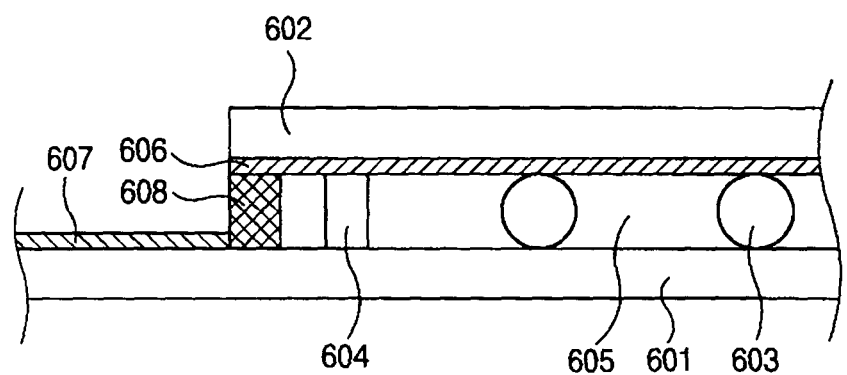
FIG. 8 is a schematic cross-sectional view illustrating a structure of one edge of the liquid crystal display panel.

FIG. 8 is a schematic cross-sectional view illustrating a structure of one edge of a liquid crystal display panel.

As shown in FIG. 8, a liquid crystal display panel is formed such that a thin film transistor array substrate 601 and a color filer substrate 602 are attached to each other with a cell gap maintained by a spacer 603 and a seal pattern 604, and a liquid crystal layer 605 is formed in the cell gap between the thin film transistor array substrate 601 and the color filter substrate 602.

The thin film transistor array substrate 601 is formed to be protruded from the edge of the color filter substrate 602, and at the protruded portion, a gate pad part connected to gate lines of the thin film transistor array substrate 601 and a data pad part connected to data lines are formed.

At the image display part of the thin film transistor array substrate 601, gate lines to which a scan signal is applied from the gate pad part and data lines to which image information is applied through the data pad part are arranged to intersect one another, and a thin film transistor for switching liquid crystal cells and a pixel electrode connected to the thin film transistor are formed at each intersection.

At the image display part of the color filter substrate 602, color filters are separately formed at cell regions by a black matrix and a common electrode 606 for driving liquid crystal layer with the pixel electrode formed on the thin film transistor array substrate 601.

A common voltage line 607 for applying a common voltage to the common electrode 606 formed on the color filter substrate 602 is formed on the thin film transistor array substrate 601.

Thus, a silver (Ag) dot 608 may be formed either on the thin film transistor array substrate 601 or the color filter substrate 602 to electrically connect the common voltage line 607 and the common electrode 606, so that the common voltage applied to the common voltage line 607 can be applied to the common electrode 606 by way of the silver (Ag) dot 608.

One or more silver (Ag) dots 608 are formed at each unit liquid crystal display panel fabricated on the large-scale mother substrate, which can be also formed by using the dispenser for a liquid crystal display panel according to the present invention.

As stated above, in the dispenser for fabricating the liquid crystal display panel and the method for controlling a gap between the nozzle and the substrate according to the present invention, a sealant is filled in the syringe 503, the gap between the nozzle 502 provided at one end portion of the syringe 503 and the substrate 501 can be precisely controlled in forming a seal pattern at the outer edge of the image display part of the substrate 501. In this respect, in case of adopting a silver (Ag) dot, the syringe 503 is filled with silver (Ag), a gap between the nozzle 502 and the substrate 501 is precisely controlled, and a silver (Ag) droplet is dropped to a desirable position of the substrate 501. In this manner, the present invention may be applied to form the silver (Ag) dot 608.

As so far described, the dispenser for fabricating a liquid crystal display panel and the method for controlling a gap between the nozzle and the substrate by using the dispenser have the following advantages.

When driving data are inputted by a user through an input unit such as a touch panel or a keyboard, the vertical driving motor is automatically lowered, stopped, lifted up, and lowered again the body, thereby precisely controlling the gap between the nozzle and the substrate. Thus, the reliability in operation is improved compared to the manual operation.

Since the seal pattern can be formed to have height and width, a product failure of the liquid crystal display panel can be reduced.

In addition, even for an unskilled user, he/she can precisely control the gap between the nozzle and the substrate within a short time, so that the productivity can be improved.

Furthermore, the syringe can be filled with liquid crystal or silver (Ag) as well as a sealant. Thus, dropping liquid crystal or forming a silver (Ag) dot can be readily performed in the present invention.

It will be apparent to those skilled in the art that various modifications and variations can be made in the dispenser for the liquid crystal display panel and the method for controlling the gap between the nozzle and the substrate by using the same of the present invention without departing from the spirit or scope of the inventions. Thus, it is intended that the present invention covers the modifications and variations of this invention provided they come within the scope of the appended claims and their equivalents.

What is claimed is:

1. A method for dropping material for fabricating a liquid crystal display panel, comprising:
   loading a substrate on a table;
   lowering a body supporting a syringe having a nozzle at one end towards the substrate using a vertical driving motor, wherein the vertical driving motor drives the syringe according to driving data input from a user through an input unit which comprises one of a touch panel and a keyboard, wherein the lowering is performed at a first speed;
   stopping the lowering of the body when the nozzle contacts the substrate, wherein a contact type switch is opened, and lifting up the body at a second speed is slower than the first speed of the lowering the body, lifting up the nozzle to be isolated from the substrate when the body is lifted up, and a state of the contact type switch is switched; detecting and storing an initial value between the nozzle and the substrate when the body is lifted up, wherein the initial value is height information of the nozzle when the nozzle is in contact with the substrate, and wherein the detecting the initial value is performed by a laser displacement sensor; lifting up the body to be separated from the substrate with a distance; lowering the body; and stopping the lowering of the body when the nozzle reaches a desired height from the initial value so that a gap between the nozzle and the substrate is controlled to be maintained at the desired height; and
   horizontally moving the table with the loaded substrate in forward/backward and left/right directions while the dropping material within the syringe is being dropped through the nozzle onto the substrate.

2. The method of claim 1, wherein a sealant is stored in the syringe.

3. The method of claim 1, wherein a liquid crystal is stored in the syringe.

4. The method of claim 1, wherein a liquid silver is stored in the syringe.

5. A method for dropping dropping material for fabricating liquid crystal display panel, comprising:
- loading a substrate on a table;
- lowering a body supporting a syringe having a nozzle at one end towards the substrate;
- stopping the lowering of the body when the nozzle contacts the substrate, wherein a contact type switch is opened
- lifting up the nozzle to be isolated from the substrate when the body is lifted up, and a state of the contact type switch is switched;
- detecting and storing an initial value between the nozzle and the substrate when the body is lifted up, and wherein the detecting the initial value is performed by a laser displacement sensor, wherein the initial value is height information of the nozzle when the nozzle is in contact with the substrate;
- lifting up the body to be separated from the substrate with a distance, and lowering the body;
- stopping the lowering of the body when the nozzle reaches a desired height from the initial value so that a gap between the nozzle and the substrate is controlled to be maintained at the desired height; and
- horizontally moving the table with the loaded substrate in forward/backward and left/right directions while a sealant is being dropped through the nozzle onto the substrate to form a seal pattern.

* * * * *